(12) United States Patent
Pahl (10) Patent No.: US 10,627,270 B2
(45) Date of Patent: Apr. 21, 2020

(54) FLOW DETECTOR AND METHOD FOR MONITORING AN ADHESIVE FLOW

(71) Applicant: Illinois Tool Works Inc., Glenview, IL (US)

(72) Inventor: Andreas Pahl, Erkrath (DE)

(73) Assignee: Illinois Tool Works Inc., Glenview, IL (US)

( * ) Notice: Subject to any disclaimer, the term of this patent is extended or adjusted under 35 U.S.C. 154(b) by 174 days.

(21) Appl. No.: 15/541,798

(22) PCT Filed: Dec. 22, 2015

(86) PCT No.: PCT/US2015/067312
§ 371 (c)(1),
(2) Date: Jul. 6, 2017

(87) PCT Pub. No.: WO2016/122808
PCT Pub. Date: Aug. 4, 2016

(65) Prior Publication Data
US 2018/0003534 A1    Jan. 4, 2018

(30) Foreign Application Priority Data

Jan. 30, 2015  (DE) ................. 10 2015 001 102

(51) Int. Cl.
| | |
|---|---|
| *G01F 1/58* | (2006.01) |
| *B05C 11/10* | (2006.01) |
| *G01F 1/56* | (2006.01) |
| *G01F 1/20* | (2006.01) |
| *G01F 1/28* | (2006.01) |

(Continued)

(52) U.S. Cl.
CPC .......... *G01F 1/584* (2013.01); *B05C 11/1013* (2013.01); *G01F 1/20* (2013.01); *G01F 1/28* (2013.01); *G01F 1/56* (2013.01); *G01F 1/8427* (2013.01); *G01F 15/003* (2013.01);

(Continued)

(58) Field of Classification Search
CPC .......... G01F 1/584; G01F 1/8427; G01F 1/28; G01F 1/56; G01F 1/20; G01F 15/003; G01F 15/001; B05C 11/1013; B05C 11/1042; B05C 5/0295; B05C 5/02
See application file for complete search history.

(56) References Cited

U.S. PATENT DOCUMENTS 3,164,990 A *  1/1965 Henness ................... G01F 1/64
                                                        73/861.71
4,599,907 A    7/1986 Kraus et al.

(Continued)

FOREIGN PATENT DOCUMENTS

| DE | 3609190 A1 | 9/1987 |
|---|---|---|
| DE | 285188 A5 | 12/1990 |

(Continued)

OTHER PUBLICATIONS

International Search Report issued by ISA/EPO in connection with PCT/US2015/067312 dated Apr. 25, 2016.

(Continued)

*Primary Examiner* — Nathaniel T Woodward
(74) *Attorney, Agent, or Firm* — Levenfeld Pearlstein, LLC (57) ABSTRACT

A flow detector for monitoring an adhesive flow in an adhesive applicator includes a sensor device arranged in the adhesive flow. The sensor device is formed as a capacitive sensor.

10 Claims, 4 Drawing Sheets

(51) Int. Cl.
*G01F 1/84* (2006.01)
*G01F 15/00* (2006.01)
*B05C 5/02* (2006.01)

(52) U.S. Cl.
CPC .............. *B05C 5/02* (2013.01); *B05C 5/0295* (2013.01); *B05C 11/1042* (2013.01); *G01F 15/001* (2013.01)

(56) References Cited

U.S. PATENT DOCUMENTS

| | | | | |
|---|---|---|---|---|
| 4,600,124 | A | * | 7/1986 | Price ........................ B05C 5/001 |
| | | | | 219/230 |
| 4,993,269 | A | * | 2/1991 | Guillaume ............ A61B 5/0876 |
| | | | | 73/861.53 |
| 5,238,190 | A | * | 8/1993 | Herke ................... B05B 15/652 |
| | | | | 239/298 |
| 5,271,431 | A | * | 12/1993 | Mettner ..................... F15C 5/00 |
| | | | | 137/819 |
| 5,959,219 | A | | 9/1999 | Saunders |
| 2004/0171983 | A1 | * | 9/2004 | Sparks .............. A61M 5/16827 |
| | | | | 604/65 |
| 2006/0162443 | A1 | * | 7/2006 | Drummond ........... A61M 16/20 |
| | | | | 73/276 |
| 2013/0303967 | A1 | * | 11/2013 | Utz ........................ A61B 5/031 |
| | | | | 604/8 |
| 2014/0290381 | A1 | | 10/2014 | Manohara et al. |

FOREIGN PATENT DOCUMENTS

| | | |
|---|---|---|
| DE | 19539597 A1 | 4/1997 |
| DE | 102007001997 A1 | 7/2008 |
| GB | 1096021 A | 12/1967 |
| WO | 0066979 A1 | 11/2000 |
| WO | 2010031424 A1 | 3/2010 |
| WO | 2015060721 A1 | 4/2015 |

OTHER PUBLICATIONS

Written Opinion issued by ISA/EPO in connection with PCT/US2015/067312 dated Apr. 25, 2016.

* cited by examiner

FLOW DETECTOR AND METHOD FOR MONITORING AN ADHESIVE FLOW

CROSS-REFERENCE TO RELATED APPLICATION DATA

This is a National Stage Application of International Patent Application No. PCT/US2015/067312, filed 22 Dec. 2015, which claims the benefit of and priority to German (DE) Patent Application No. 10 2015 001 102.2, filed 30 Jan. 2015, the entireties of which are incorporated fully herein by reference.

BACKGROUND

The invention relates firstly to a flow detector for monitoring an adhesive flow, for example a hotmelt adhesive, in an adhesive applicator.

It is typically found to be problematic for users if it is detected too late that the adhesive flow in an applicator is no longer taking place as desired. There may be various causes for this: for example, a (geared) feed pump may no longer be feeding, an application module may no longer be opening or a directional valve may no longer be functioning correctly.

Such defects are often only detected too late during the process of applying the adhesive. In this case, very many products may possibly already be defective or have been produced without adhesive being applied and represent rejects.

All of the defects mentioned ultimately lead to no adhesive actually flowing any longer to the substrate or product to which it is being applied.

A first approach to eliminating this problem in the prior art is for example to use optical detectors that monitor the movement of the needle of the application module. However, this approach is very complex to implement and substantially concerns just the application module.

It is also known to introduce mechanical sensor devices directly into the adhesive flow. However, mechanical detectors known from other types of fluid (such as water), such as for example impellers, cannot be readily used in the case of adhesives on account of an easily gummed-up mounting.

For the use of adhesives, therefore, very complex flowmeters are known, using the principle of a geared pump (that is to say likewise a mechanical sensor device) to detect flows or quantitatively determine flows. Even when a relatively accurate measurement is possible as a result, such flowmeters are very complex to produce and are also of a very large construction.

SUMMARY

The object of the present invention is accordingly to provide a flow detector for monitoring an adhesive flow that is robust, reliable and can be produced in a relatively uncomplex manner.

The invention achieves this object by the features of patent claim 1, in particular by those of the characterizing part, and is accordingly characterized in that the sensor device is formed as a capacitive sensor.

Consequently, the concept of the invention is substantially to dispense with complex mechanical structures, such as gear wheels, and instead to use a capacitor, in particular a capacitor that can be flowed through, for the flow detection.

The capacitive sensor operates on the basis of the change in the capacitance of an individual capacitor (or of an entire capacitor system). The capacitance may in principle be influenced here in various ways.

The capacitive sensor is substantially based on the notion that two electrodes form the "plates" of an electrical capacitor, the capacitance or change in capacitance of which is measured.

The capacitive sensor is in this case arranged in the adhesive flow and can in particular be flowed through by the adhesive. For this purpose, the flow detector has in particular an inlet and an outlet for the adhesive. The sensor device may also itself have an inlet and an outlet for the adhesive.

In this sense, both electrodes of the pair of electrodes of the capacitor may for example be assigned passages. If a (separate) dielectric is arranged between the two electrodes, this may also have a passage for the adhesive.

Alternatively, it may also be provided that only one electrode has a corresponding passage and the other electrode is for example just flowed around.

The passage in one of the electrodes may in particular be provided by a movable portion of the electrode, the movable portion being able to close the electrode or the passage if no adhesive flow is taking place.

Adhesives impose particularly high requirements on flow detectors, since mechanical components in particular easily become gummed up. Therefore, when using a flow detector, a capacitive sensor is particularly suitable for monitoring an adhesive flow.

In the sense of the present patent application, a hotmelt adhesive (known as a "hot melt") may be understood in particular as the adhesive. In this case, the flow detector serves for monitoring a hotmelt adhesive flow in a hotmelt adhesive applicator.

Adhesive applicators are sufficiently well known in the prior art. They are relatively complex machines or apparatuses, which are in particular unable to be held in the hand ("handheld"). Such applicators are typically installed in the user's production works and are substantially immobile (in particular on account of their weight).

The flow detector according to the invention may firstly be used in principle to detect an adhesive flow. In this sense, the flow detector may also be referred to as a flow switch, since it is first of all most important to monitor whether an adhesive flow is taking place in the adhesive applicator at all.

Alternatively, however, a flow detector according to the invention may also be used in a further extended way. Thus, in principle, a quantitative monitoring of the adhesive can also be performed with the flow detector. For this purpose, the measured capacitance or a change in capacitance can allow conclusions to be drawn about properties of the adhesive flow in the flow detector by carrying out a conversion calculation, in particular with prior calibration of the flow detector. For the purpose of calibration, the flow detector may in particular also perform measurements when there is not yet any adhesive flow at all flowing through the flow detector.

In order to detect an adhesive flow, the capacitive sensor may be based on different fundamental principles, concerning the type of change in capacitance of the capacitor.

According to the preferred embodiment of the invention, the capacitive sensor has a detector electrode, which can be moved at least in certain portions by the adhesive flow. In this sense, one of the electrodes of a capacitor, specifically the detector electrode, may in particular be displaced or deformed or partially displaced by an actuating effect, specifically the adhesive flow.

The detector electrode may have here portions that are moved or displaced by the adhesive flow. The displaceable portions may in particular be formed in one piece with the rest of the detector electrode. Alternatively, it is also conceivable that the entire detector electrode can be moved by the adhesive flow.

The detector electrode may have parts that are movable for this purpose, such as for example tongues, fins, flaps or else membranes or the like.

The mobility of the detector electrode portions (or of the entire detector electrode) leads to a movement or deflection or the like of the movable portion of the detector electrode when the adhesive flow occurs, whereby at least the average or effective distance between the pair of electrodes of the capacitive sensor changes. Since the average or effective distance between the two electrodes behaves substantially in inverse proportion to the measured capacitance at the capacitor, a change in this distance also leads directly to a change in the measured capacitance (which in turn results in a measurable change in capacitance).

If the detector electrode or its movable portion is moved by the adhesive flow away from the other electrode, the average distance increases, whereby the measured capacitance is reduced.

As an alternative to the preferred embodiment, other fundamental principles are also conceivable in principle, for example a change in the effective plate area in the case of the variable capacitor or else an influencing of the capacitance of the capacitor just by the dielectric properties of the adhesive when the adhesive flow commences.

According to a preferred embodiment, the detector electrode forms the rear electrode of the pair of electrodes with respect to the direction of flow of the adhesive flow. In this sense, the downstream electrode is to be understood as the rear electrode, which in the case of a detector electrode that is movable at least in certain portions has the advantage that the detector electrode is moved away, at least in certain portions, from the other electrode of the pair of electrodes. In this way, short circuits or the like can be prevented in particular.

Advantageously, the detector electrode has (one or more) movable tongue(s) that can be made to extend by the adhesive flow. This tongue or these tongues may for example be formed in one piece with the rest of the electrode. The tongue may in this case be connected to the rest of the detector electrode by way of a tongue base and be movable in particular in its head region. It is preferred that the tongue can be made to extend out of the main plane of extent of the detector electrode. If the detector electrode is formed as a plate, the tongue can be made to extend out of the plane of the plate by the adhesive flow. If there is no adhesive flow, the tongue can return into the main plane of extent of the detector electrode. In this sense, it is preferred that it is provided that the tongue is prestressed out of its extended position into its rest position, in particular in the main plane of extent of the detector electrode.

The tongue may in this case advantageously be formed as an uninterrupted area. Alternatively, tongues which themselves have clearances and can be flowed through may also be provided.

In the preferred case that the detector electrode has a movable tongue, it is advantageously likewise provided that the flow detector has an adhesive outlet that is arranged outside the region in line with the head of the tongue. In this way the extended head of the tongue can be prevented from covering, blocking or the like the adhesive outlet. To be regarded here as the region in line with the head of the tongue is in particular the region that is located downstream of the head of the tongue, seen in the direction of flow. For example, the adhesive outlet may therefore be arranged in the region in line with the tongue base, or else completely outside the region in line with the tongue.

According to a further advantageous refinement of the invention, the detector electrode has a passage for the adhesive flow. In this sense, the detector electrode is flowed through by the adhesive when there is a sustained adhesive flow. This may in particular lead to a movable portion of the detector electrode being moved or deflected.

As soon as the adhesive flow subsides, the passage can however be closed or substantially closed again by the movable portion of the detector electrode. In other embodiments, the passage may, however, also just consist of a clearance or of a number of immovable clearances in the detector electrode, for example if the entire detector electrode is moved or if a change in the capacitance is not achieved by a change in the distance between the pair of electrodes but by the dielectric properties of the adhesive itself.

With preference, the other electrode of the pair of electrodes (which comprises the detector electrode) may also have a passage. This electrode can consequently also be flowed through by the adhesive. Alternatively, it may also be provided that this electrode does not have a passage and is just flowed around or the like.

If, however, the other electrode of the pair of electrodes also has a passage, this can be used for example for the purpose of directing the adhesive specifically to the detector electrode. Alternatively or in addition, the passage may also serve as a filter for the adhesive and be formed in such a way that adhesive-contaminating particles from the other electrode are filtered out from the adhesive flow. Finally, in principle, the invention also comprises that the other electrode is also movable, at least in certain portions.

According to a further embodiment of the invention, a dielectric arranged between the pair of electrodes comprising the detector electrode and the other electrode may also have a passage (irrespective of whether or not the electrodes have a passage). If both the dielectric and the detector electrode have a passage, it is preferably provided that the passage in the dielectric covers or covers over the passage in the detector electrode (or the passages at least overlap). In this way it is ensured that the adhesive passes through the dielectric to the passage in the detector electrode. A passage in the other electrode and a passage in the dielectric may preferably also cover over one another, at least in certain portions, so that it is ensured that the adhesive that is directed through the other electrode also meets the passage in the dielectric.

Particularly preferred is a dielectric that offers a large passage (that is to say has a greater passage area than for example the detector electrode or the other electrode). In this way, when there is an adhesive throughflow into the plane of the dielectric, a lot of adhesive can enter, which—depending on the material of the dielectric—can lead to an increased dielectric strength.

According to a further particularly advantageous refinement of the invention, the sensor device has a mechanical short-circuit lockout, which prevents the detector electrode that is movable at least in certain portions from contacting the other electrode of its pair of electrodes. This short-circuit lockout may preferably be formed here by a dielectric between the two electrodes. In this case it may be provided that the passage in the dielectric for the adhesive is not formed so large in terms of the area that the movable portion of the detector electrode can pass through the passage in the dielectric. In other words, the dielectric must extend into the path of movement of the movable portion of the detector electrode.

If, for example, the detector electrode has a movable tongue, the edge of a passage in the dielectric may be assigned to the head of the tongue in such a way that the tongue butts against said edge when there is a movement toward the other electrode.

According to a particularly preferred embodiment of the present invention, the flow detector is formed as a separate component, the housing of which has two adapter areas, one of which has an adhesive outlet and one of which has an adhesive inlet. This refinement makes it possible in particular to provide a modular adhesive applicator.

This is so because, depending on the application, such a flow detector may or may not be provided in the case of an adhesive applicator. Such a modular flow detector can be used variously in the case of an adhesive applicator and, depending on the application, can also be built in at different locations of the adhesive applicator, for example in a first application between the application module and the base of the applicator or in another application further upstream in terms of the adhesive flow, for example between the base of the applicator and the adhesive feed or the like.

The adapter areas may advantageously be formed as smooth and, during assembly, come to lie against mating adapter areas of the other components, which then preferably likewise have a planar or smooth form. The flow detector may in this case also be assigned seals, for example in the manner of O-rings or the like, which increase the seal-tightness of the adhesive applicator having the flow detector.

The modular flow detector may also have lines for functions that do not directly concern the detector. In this sense, the detector may for example have lines for spraying air, valve air or else for electronic connections of other components or the like.

A further aspect of the invention concerns a method for monitoring an adhesive flow of an adhesive applicator. Such methods are based in the prior art on the use of the flow detectors described at the beginning as prior art. The object of the invention is therefore also to provide a method that facilitates the monitoring of an adhesive flow.

According to the invention, this object is achieved by a capacitive sensor being arranged in the adhesive flow and capacitance values of the sensor being measured for the detection of an adhesive flow.

In particular, a flow detector as claimed in one of patent claims 1 to 8 may be used for carrying out such a method.

Accordingly, all of the advantages, modifications, designs, features and the like presented with respect to the device claims 1 to 8 can also be transferred to the method claims according to patent claims 9 and 10. The same also applies conversely. It is only for reasons of overall clarity that not all of the advantages described with respect to the device claims are repeated in connection with the description of the method according to the invention, and vice versa.

In the case of the method according to the invention, which can advantageously be used in the case of a so-called hot melt or hotmelt adhesive, the capacitance values of the sensor can be measured in a wide variety of ways.

Thus, for example, the capacitance values may be measured automatically after fixed time intervals or else be manually initiated.

In particular, a method for calibration may be provided, a measurement being carried out on the capacitive sensor when an adhesive flow is not taking place, in order to establish a basic capacitance. On the basis of this basic capacitance, a calibration may for example then be performed, or a comparison may be performed with the measured values that are determined with a flow detector through which adhesive flows. The deviation from the basic capacitance is already an indication here that an adhesive flow is taking place at all.

In the case of the method according to the invention, it is advantageously provided that an alarm is triggered as soon as the measured capacitance values reach or overshoot or undershoot a prescribed threshold value when the adhesive applicator is running. As soon as the threshold value is reached or overshot or undershot, it can be indicated to the user of the adhesive applicator that there is a problem and that the user should possibly switch off the applicator immediately. All possible optical, acoustic or similar signal messages or the like can be output here as the alarm.

The threshold value may in particular be manually set or fixed or else preset at the factory. As long as the measurement result has not yet reached the threshold value, it is assumed that a sufficient adhesive flow is taking place. The setting of the threshold value consequently corresponds to the setting of a desired tolerance. The greater this tolerance is, the later an alarm is triggered, it being assumed in this case that greater fluctuations in the adhesive flow are inconsequential.

In particular, in the case of this method the flow detector may be assigned pushbuttons in order to allow a so-called "TEACH-IN". Thus, there may be a "TEACH-IN" button for when there is no adhesive flow and a (separate or the same) "TEACH-IN" button for when there is the adhesive flow applied at production speed.

Both measured capacitance values may then be stored by electronics assigned to the sensor and the flow detector can be automatically calibrated. Advantageously, one or more threshold values may also be fixed.

Furthermore, changes in temperature can be advantageously taken into account. In this sense, the adhesive flow may be assigned for example a temperature sensor, which cooperates with the flow detector or the capacitive sensor thereof and takes into account changes in capacitance at different temperatures, in particular by way of electronics.

Finally, in a preferred method step, an integrator that averages the measured values may be used. This integrator is necessary in the case of a so-called "intermittent" application, in which the adhesive is not discharged continuously but intermittently by the adhesive applicator. Without taking an integrator or integrator circuit into account, an alarm would be triggered every time there is a temporary stop in the application in the course of the intermittent application process, which however is not desired of course. Therefore, the integrator may average measured values over a time period of for example 0.5 to 3 sec.

In this sense, the flow detector may have an integrator or the flow detector may be assigned an integrator.

Further advantages and refinements of the invention arise on the basis of the possibly uncited subclaims and on the basis of the description of the figures which now follows. In the description of the figures:

It should be mentioned before the following description of the figures that the same or comparable parts are possibly provided with identical designations, sometimes with the addition of lowercase letters or apostrophes.

Figure 1:
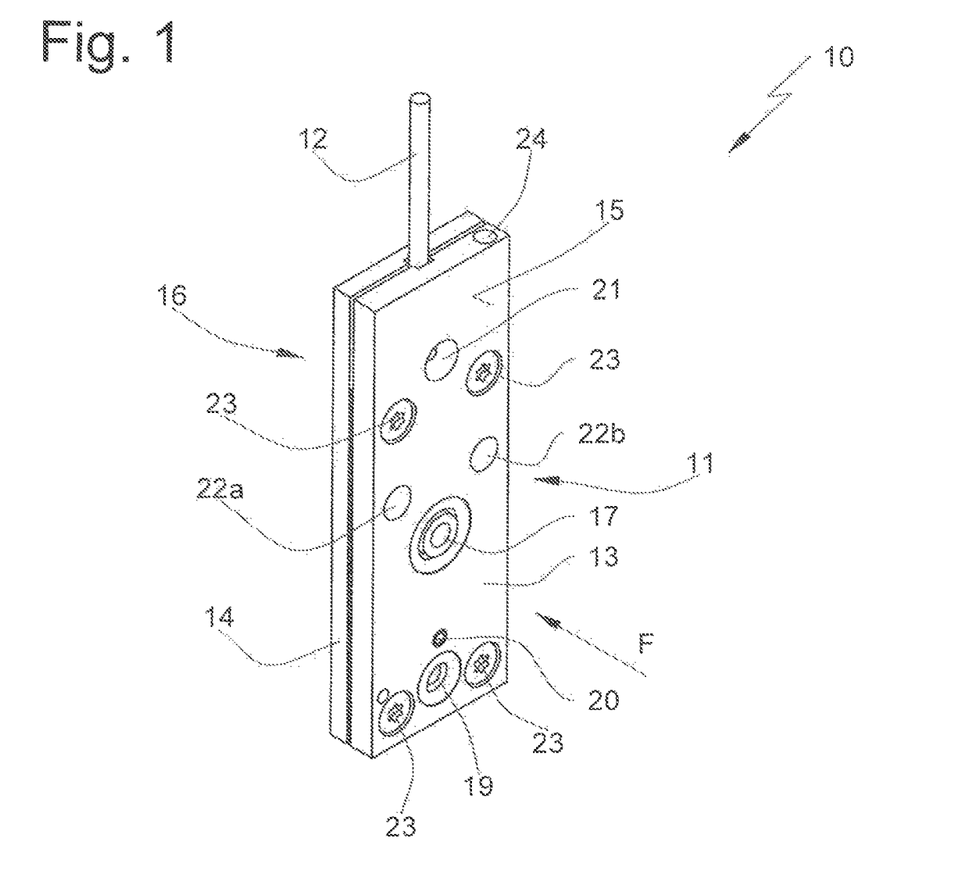
FIG. 1 shows a schematic, perspective oblique view of a flow detector according to the invention in the assembled state.

FIG. 1 firstly shows a schematic oblique view of a flow detector according to the invention, comprising a housing 11 and also an electrical connection 12.

FIG. 1 already reveals the fundamentally sandwich-like structure of the flow detector 10, with a front housing plate 13, with respect to the flow direction F, and a rear housing plate 14, with respect to the flow direction F.

DETAILED DESCRIPTION

The housing plates 13 and 14 typically consist of aluminum.

FIG. 1 allows in particular the view of a front adapter area 15 (the rear adapter area 16 cannot be seen) with an adhesive inlet 17 (the rear adhesive outlet 18 likewise cannot be seen in FIG. 1).

Furthermore, the front adapter area 15 has the entrance of a spraying air channel, the spraying air not being required however in the detector 10 and only being directed through it. Furthermore, the opening 20 of a test channel to be described later can be seen, and also a silicone inlet 21 and further through-channels 22a and b, which may for example serve for leading heating lines or electronic lines through the adapter or for assembly.

Finally, FIG. 1 also shows the heads of four connecting means 23, in particular in the manner of screws.

For example, on its upper side, the detector 10 also has an inlet 24 for a temperature sensor or thermometer, which can monitor the temperatures in the flow detector.

The housing 11 of the flow detector 10 is in this case held together in its sandwich-like structure substantially by the four connecting means 23, it also being possible in particular for the lateral edges of the housing to be assigned sealing means, a protective coating or the like (not represented), in order to provide the flow detector 10 with a lateral protection.

Figure 2:
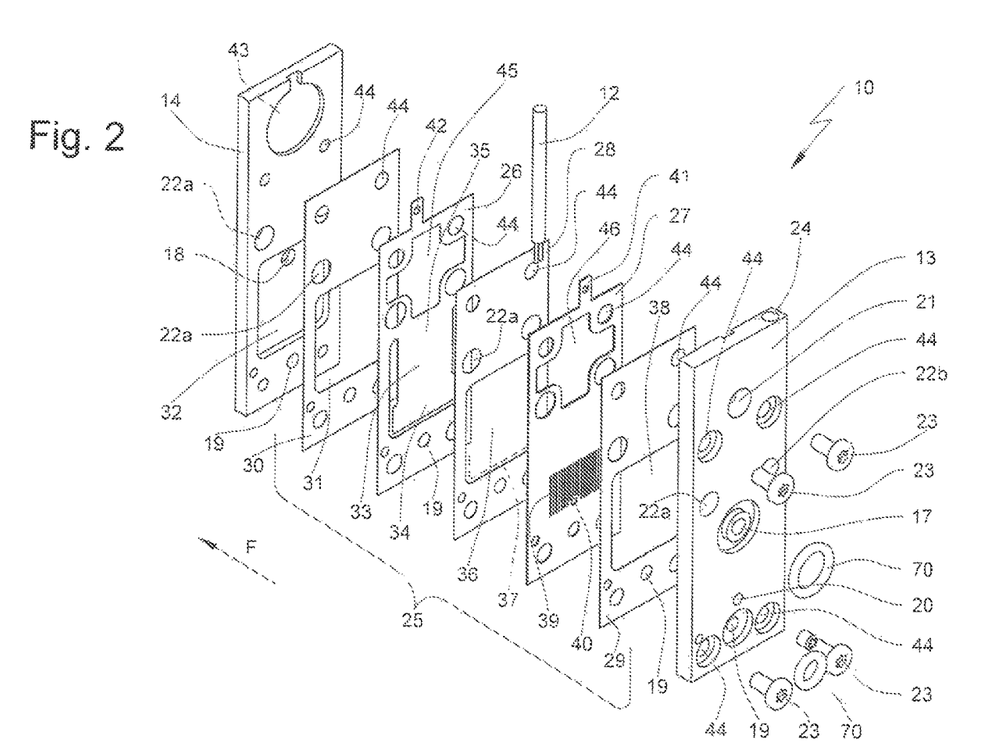
FIG. 2 shows the flow detector as shown in FIG. 1 in an exploded representation.

FIG. 2 shows views into the interior structure of the flow detector 10. Thus, incorporated within the two housing plates 13 and 14 there is a capacitive sensor 25, which in particular has a pair of electrodes consisting of a detector electrode 26 and another electrode 27 (hereinafter also referred to as the inlet electrode 27). The two electrodes 26 and 27 are preferably formed from high-grade steel, in particular from flat high-grade steel plates or sheets. These have the advantage that the outer contour, and possibly also inner openings of the electrodes 26 and 27, can be produced in a laser cutting process.

Arranged between the two electrodes 26 and 27 is a dielectric 28 of the sensor 25, which may preferably consist of a polyimide sheet (for example Kapton). In principle, however, other types of dielectric are also conceivable, for example in trials the dielectric has been produced from paper.

What is especially decisive is that the dielectric is highly temperature-resistant and thermally conducting. It should of course preferably also have good dielectric properties. It is particularly preferred that the dielectric may also be formed, as represented, as a flat gasket.

Finally, also respectively arranged on the side of the two electrodes 26 and 27 that is facing away from the dielectric 28 there is an insulating layer/plate 29, 30 of an electrically insulating material, in order that the electrodes 26 and 27 are not in direct contact with the housing plates 13 and 14.

The rear insulation 30 in flow direction F has in this case (as in the case of the front insulation 29) a central opening 31, which corresponds approximately to an indentation 32 in the rear housing plate 14. This indentation 32 is in this case assigned in particular the adhesive outlet 18 of the flow detector 10 according to the invention.

The indentation 32 has in particular the function of providing freedom of movement for a tongue 33 of the detector electrode 26 in flow direction F. Thus, the tongue 33 of the detector electrode 26 can be made to extend by an applied adhesive flow in flow direction F, it entering, in particular with its head 34, into the indentation 32 of the rear housing plate.

In order that the head 34 of the tongue 33 does not thereby cover or block the detector outlet 18, this outlet 18 is not arranged in the region in line with the head 34 of the tongue but higher, that is to say in the region in line with the base 35 of the tongue.

As FIG. 2 reveals, the tongue 33 is formed by introducing a substantially U-shaped slot into the detector electrode 26. The U-shaped slot may in particular be cut out in a laser cutting process, but alternatively also be punched out or the like.

In order to make a best possible adhesive flow possible, the dielectric 28 also has an opening 36 similar to the opening 31 of the insulation 30, it being possible however for the lower edge of this opening 36 to be drawn up somewhat, as indicated in FIG. 2 by a dashed line, in order to use this edge 37 as a short-circuit lockout. This is so because the drawn-up edge 37 prevents the tongue 33 from being able to come into contact with the other electrode 27 when there is a movement of adhesive counter to the flow direction F as a result of a negative deflection. The edge 37 is consequently located in the path of movement of the tongue 33 or the head 34 of the tongue 33.

In order that the adhesive can pass from the detector inlet 17 to the tongue 33 at all, firstly the insulation 29 also has an opening 38, which corresponds approximately to the dimensions of the openings 31 and 36 (on the inner side of the front housing plate 13, which is not represented in FIG. 2, there may also be provided an indentation 32' equivalent to the indentation 32).

The inlet electrode 27 also has a passage 39 for the adhesive, which in the exemplary embodiment represented is formed in the manner of slits. By contrast with an opening that passes all the way through the inlet electrode 27, these slits make a certain filtering property possible for the filtering of contaminants from the adhesive flow. Alternatively, this passage or filter 39 may of course also have different forms, for example a number of punctiform holes or the like.

Represented in the region of the passage 39 is a further hole 40, which represents the rearmost portion of the test channel with the front opening 20. This is so because a manual deflection of the tongue 33 can take place through the holes or openings 20, 40 and also 38 and 36. For example, a person entrusted with the maintenance and testing of the flow detector can reach with a nonconducting screwdriver or similar implement into the test bore, or the openings 20, 38, 40, 36 thereof, and deflect the head 34 of the tongue 33 in flow direction F directly by contact. This test channel can also be closed again by the manufacturer before the applicator is used by the customer. It is important here however that the edge 37 is not arranged in line with the hole 40.

As FIG. 2 likewise indicates, the two electrodes 26 and 27 are connected to the electrical connection 12, specifically preferably by way of the represented electrode connections 41 and 42, respectively, on the electrodes. The represented cables may for example be soldered or the like to the connections 41 and 42. In order to obtain further insulation, in particular from an electrical viewpoint, FIG. 2 shows in the rear housing plate 14 a further, upper indentation 43. An equivalent indentation is also provided on the inner side of the front housing plate 13, which is not represented. These two indentations 43 thereby make sufficient connection space possible in the manner of a chamber for the connections of the electrical connection 12 on the electrodes by way of the electrode connections 41 and 42 in spite of the small overall space provided by the sandwich-like structure. In order to improve the electrical insulation, after carrying out the electrical connection, silicone may be introduced by way of the silicone inlet 21 into the indentations 43 or the chamber thereof, in order to surround and insulate the part of the electrical connection 12 located in the housing and also the electrode connections 41 and 42 with silicone.

Once the silicone has been introduced through the inlet 21, the inlet 21 may possibly be closed, if necessary.

Likewise for reasons of insulation, the connecting means 23 are not formed from electrically conductive material (such as metal) but typically from plastic. In particular, the screws 23 may consist of so-called Peek plastic.

These screws 23 are then introduced into bores or openings 44, which are provided congruently both in the front and rear housing plates 13, 14 (as bores) and also in the insulations 29, 30, the electrodes 26, 27 and also the dielectric 28 (openings). Typically, the bores 44 in the rear housing plate 14 are formed as blind bores.

As FIG. 2 reveals, all of said components also have bores or openings that are congruent with respect to the through-channels 22a, 22b and the spraying air entrance 19, not all of which however are provided with separate designations in FIG. 2 (and are just indicated by way of example).

Both the adhesive inlet 17 and the spraying air entrance 19 also have in FIG. 2 assigned annular seals 70.

Finally, FIG. 2 also shows that both electrodes 26 and 27 have in the upper region material clearances 45 and 46, respectively.

These serve here for improved capacitance measurement, since the proportion of material of the detector electrode that is made up in particular by the tongue 33 is increased in terms of a percentage, and a movement of the tongue 33 consequently has a greater influence on the measurement as a whole.

Figure 3:
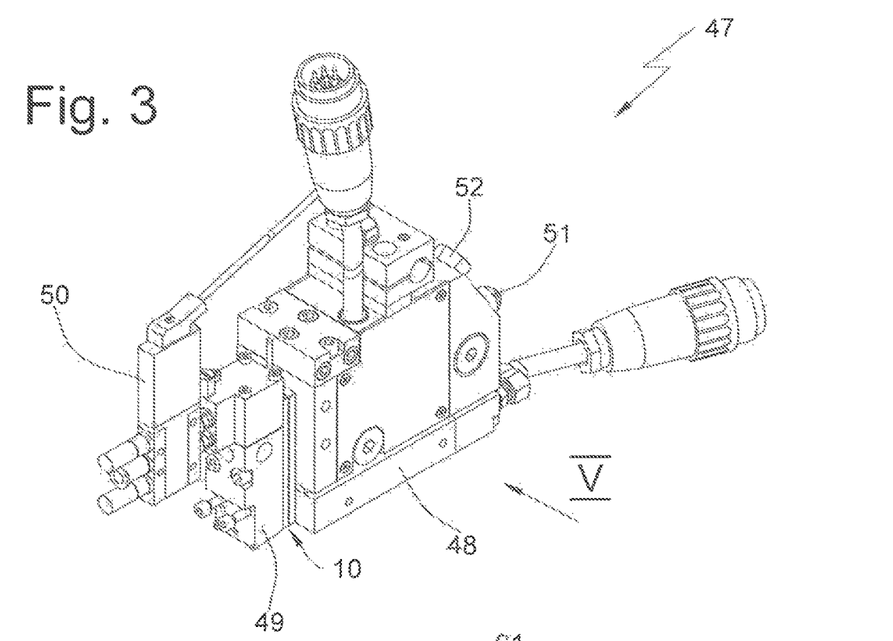
FIG. 3 shows a schematic, perspective view of an adhesive applicator having the flow detector according to the invention as shown in FIGS. 1 and 2.
Figure 4:
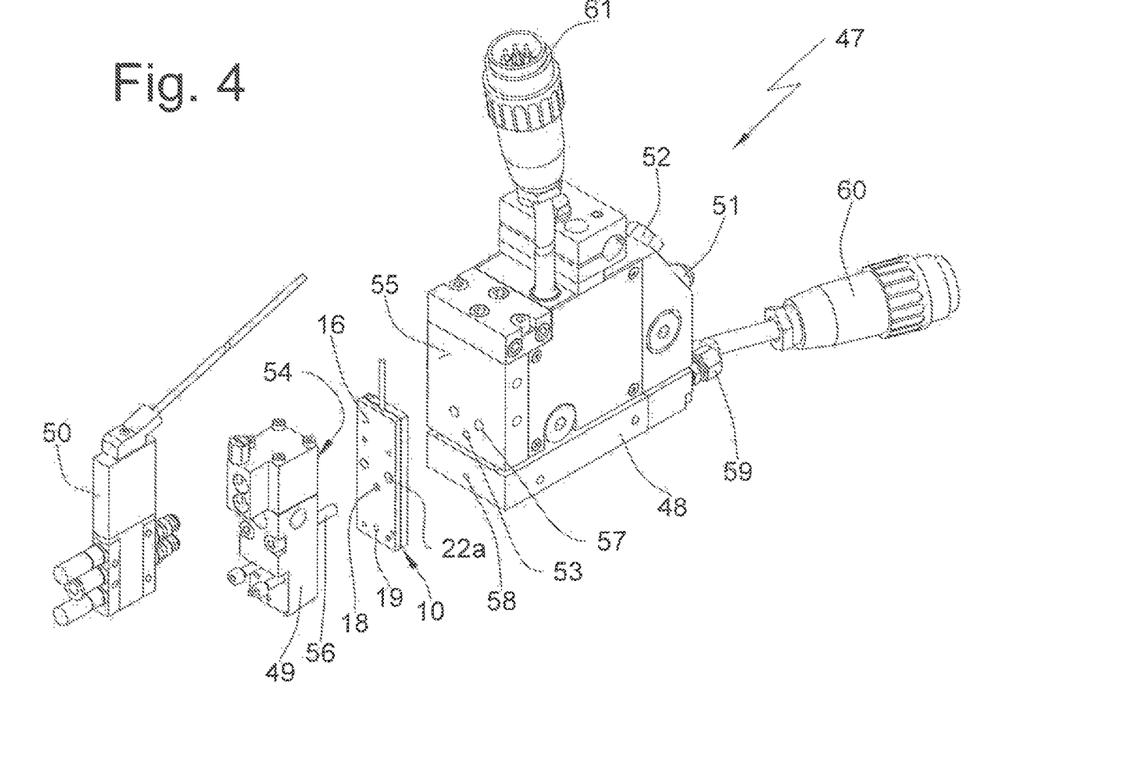
FIG. 4 shows the adhesive applicator as shown in FIG. 3 in an exploded representation with respect to the individual subassemblies.

FIGS. 3 and 4 show an adhesive applicator 47 with a built-in flow detector 10. In the present case, the flow detector 10 is arranged between the base 48 of the adhesive applicator 47 and the application module 49. In FIGS. 3 and 4, a screw-on discharge nozzle assigned to the application module 49 has been omitted for the sake of overall clarity. Nevertheless, however, the valve 50 for switching the application module 49 is represented.

Adhesive can enter the applicator 47 at the adhesive inlet 51, first run through a filter 52 of the base 48 and then, by way of an adhesive outlet 53 of the base 48, enter the flow detector 10 (by way of the adhesive inlet 17 not represented in FIG. 4). After flowing through the detector 10, the adhesive can leave the detector 10 by way of an adhesive outlet 18, arranged on its rear adapter area 16, and enter the application module 49, from which it can then be delivered by way of the nozzle not represented.

As FIG. 4 shows, the rear adapter area 16 may be arranged against a mating adapter area 54 of the application module 49. The same applies to the front adapter area 15, which though not represented in FIG. 4 can be readily arranged against the mating adapter area 55 of the base 48.

The modular structure of the applicator 47 is demonstrated by the fact that it is easily possible to imagine the flow detector 10 being simply omitted and the mating adapter area 54 connected directly to the mating adapter area 55. For assembly, the application module 49 as shown in FIG. 4 has in particular an assembly bolt 56, which can pass through the through-channel 22a of the flow detector 10 and can reach into an assembly bore 57 of the base 48 for purposes of fastening.

With respect to FIG. 4, it should finally also be pointed out that the flow detector 10 can direct spraying air by way of the spraying air channel 19 from the base 48 (emerging there from the outlet 58) further to the application module 49, without the spraying air performing any function in the detector. Rather, the spraying air is introduced by way of the spraying air connection 59 into the base 48 (heated there by a heater which can be operated by way of an electrical connection 60, by contrast with the electrical connection 61, which serves for heating the adhesive) and then is simply directed further by the flow detector 10.

Figure 5:
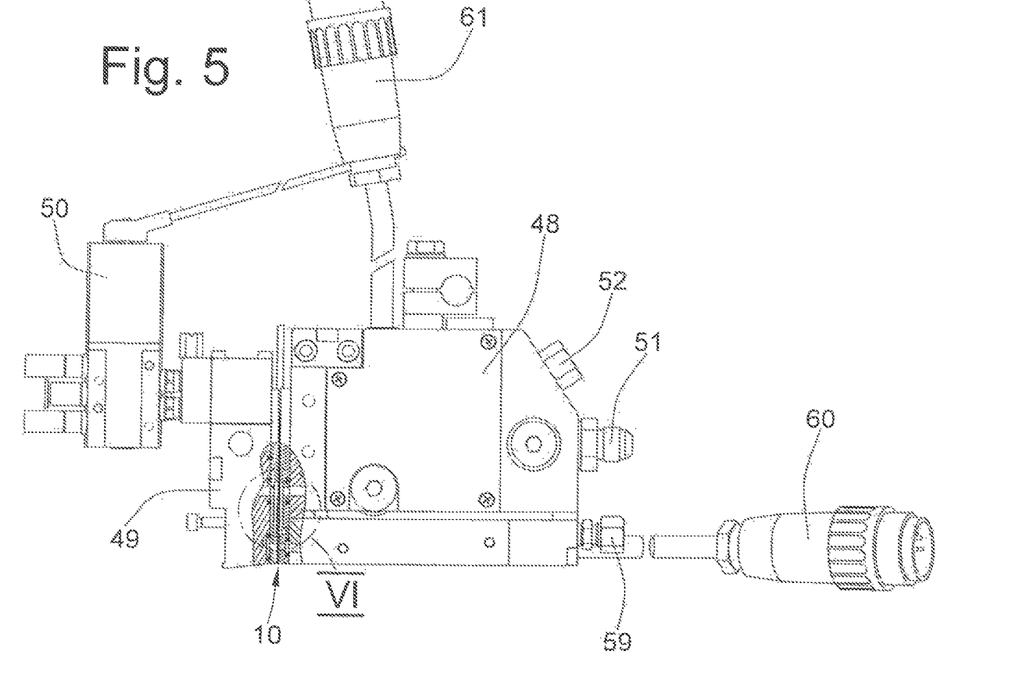
FIG. 5 shows a schematic sectional view according to the viewing arrows V in FIG. 3 through the adhesive applicator.
Figure 6A:
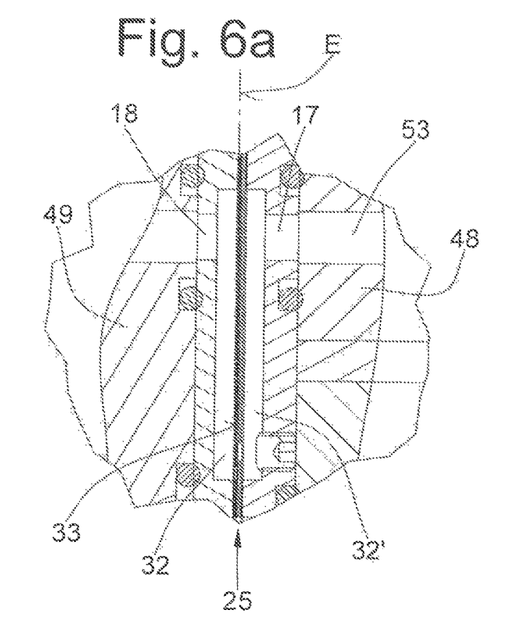
FIG. 6a shows a very schematic enlarged representation of the region identified in FIG. 5 by VI, concerning the flow detector, with the tongue located in the main plane of extent of the detector electrode.
Figure 6B:
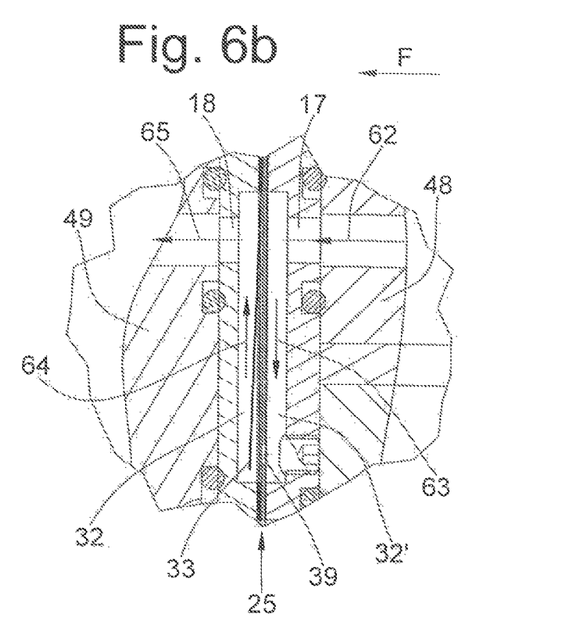
FIG. 6b shows a view as shown in FIG. 6a with an active adhesive flow and an extended tongue.

Finally, the carrying out of a measurement is to be illustrated on the basis of FIGS. 6a and 6b, which just represent enlarged, schematic representations of the region of the cross-sectional drawing represented in FIG. 5 that is identified in FIG. 5 by VI.

Thus, a first measurement by the capacitive sensor 25 may be performed for example with the feeding of the adhesive switched off (for example at a point in time at which a feed pump connected to the adhesive inlet 51 or a feed pump arranged in the base 48 is not yet active or has been switched off). In this case, there may indeed be adhesive in the adhesive channels of the base 48 and of the application module 49 as shown in FIG. 6a and also in the adhesive outlet 18 as well as in the adhesive inlet 17 of the flow detector 10 and in the indentations 32 and 32' of the front and rear housing plates 13, 14. However, this adhesive typically does not as yet form any detectable adhesive flow that would be measurable. Therefore, as shown in FIG. 6a, the tongue 33 is also still located in the main plane of extent E of the detector electrode 26 or of the entire sensor 25.

Already at a point in time as shown in FIG. 6a, a first trial measurement may be carried out, in order to determine a basic capacitance value.

Furthermore, a further measurement may be performed to determine a base capacitance with the extended tongue 33 as shown in FIG. 6b, that is to say with an active adhesive flow in the feed direction or flow direction F.

On account of the deflection of the tongue 33, a change in the capacitance of the capacitor with the two electrodes 26 and 27 takes place, whereby a measurement result that deviates from the basic capacitance can be measured in the second measurement. Consequently, this second measurement can determine a base capacitance that deviates from the basic capacitance for the set, desired flow of the adhesive.

There are in principle a number of possible ways of generating or determining an error message on the basis of these data. Thus, the difference between the base capacitance and the basic capacitance may be determined as a change in capacitance or capacitance delta. If the change in capacitance or the base capacitance undershoots or overshoots a previously fixed value (for example of 20 percent of the base capacitance), an alarm may be triggered. This alarm may be output locally at the assembly location of the adhesive applicator, for example as an acoustic or optical signal. Alternatively, however, the alarm may also be sent, for example via the Internet, to the manufacturing company of the adhesive applicator that is entrusted with remote maintenance or the like.

Instead of detecting the change in capacitance, it is also possible that just a monitoring of the base capacitance takes place. If a measurement of the base capacitance deviates from a preset value (for example according to the first calibration measurement of the base capacitance), an alarm may be output.

With respect to the measurement, it should be noted in conclusion that finally the temperature within the detector 10 (which is decisively determined by the temperature of the adhesive) may also be taken into account for the decision whether or not an alarm is triggered. In this respect, the temperature sensor introduced into the opening 24 as shown in FIG. 1 may measure the temperature in the interior of the detector 10, and likewise pass it on to a controller for being taken into account in the decision about an alarm.

Last but not least, the fundamental flow path in the flow detector 10 is to be presented once again on the basis of FIG. 6b, which represents the deflection of the tongue 33 by an adhesive flow. Thus, the adhesive is introduced according to arrow 62 by way of the detector inlet 17 into the detector 10, and reaches there the indentation 32' in the front housing plate 13. In this indentation 32', the adhesive is directed downwardly according to arrow 63, in order to arrive at the passage or filter 39 of the inlet electrode 27 through the opening 38 of the insulation 29 (cf. FIG. 2). By flowing through the opening 36 of the dielectric 28, the adhesive flow can then deflect the tongue 33 of the detector electrode 26 and pass through the opening 31 in the second insulator 30 into the indentation 32 of the rear housing plate 14, in which the adhesive can rise up according to arrow 64 and leave the detector 10 through the outlet 18 of the detector 10 according to arrow 65.

This cross-sectionally substantially U-shaped flow path makes a particularly advantageous throughflow possible within the detector. It is ensured by this type of direction that the flow space of the detector is actively flowed through virtually completely. As a result, so-called "dead zones" are avoided.

In particular, the use of a capacitive sensor means that scarcely any pressure loss occurs in the detector.

The invention claimed is:

1. A flow detector for monitoring an adhesive flow in an adhesive applicator, comprising an adhesive inlet configured to receive an adhesive and an adhesive outlet configured for egress of the adhesive such that an adhesive flow is formed between the adhesive inlet and the adhesive outlet, and a sensor device arranged in the adhesive flow, wherein the sensor device is formed as a capacitive sensor, wherein the sensor device is arranged between an applicator base and an applicator module of the adhesive applicator, wherein the capacitive sensor includes a detector electrode comprising a movable tongue, the movable tongue having a base at a fixed end and a head at a free end, the head configured to deflect in a direction of the adhesive flow, and wherein the adhesive outlet is offset from the head and aligned with the base in a direction of the adhesive flow.

2. The flow detector of claim 1, wherein deflection of the tongue by the adhesive flow brings about a change in capacitance on account of a change in an average distance between a pair of electrodes of the capacitive sensor.

3. The flow detector of claim 2, wherein the detector electrode forms a rear electrode of the pair of electrodes with respect to the direction of flow of the adhesive flow.

4. The flow detector of claim 3, wherein the detector electrode has a passage for the adhesive flow, and wherein the other electrode of the pair of electrodes also includes a passage and/or a dielectric arranged between the pair of electrodes also having a passage.

5. The flow detector of claim 2, wherein the movable tongue is extendable out of a main plane of extent of the detector electrode.

6. The flow detector as claimed in claim 1, wherein in that the sensor device has a mechanical short-circuit lockout, which prevents the detector electrode that is movable at least in certain portions from contacting the other electrode of its pair of electrodes, the short-circuit lockout being provided by a dielectric arranged between the pair of electrodes.

7. The flow detector of claim 1, wherein the flow detector is formed as a separate component and includes a housing, the housing having two particular planar, adapter areas, one of which has the adhesive outlet and one of which has the adhesive inlet.

8. A method for monitoring an adhesive flow in an adhesive applicator using a flow detector of claim 1, wherein a capacitive sensor is arranged in an adhesive flow and measured capacitance values of the sensor are measured for a detection of the adhesive flow.

9. The method of claim 8, wherein an alarm is triggered as soon as the measured capacitance values reach or overshoot or undershoot a prescribed threshold value when the adhesive applicator is running.

10. A flow detector for monitoring an adhesive flow in an adhesive applicator, comprising a sensor device arranged in the adhesive flow, wherein the sensor device is formed as a capacitive sensor,
   wherein the capacitive sensor has a detector electrode, which can be moved at least in certain portions by the adhesive flow to bring about a change in capacitance on account of a change in an average distance between a pair of electrodes of the capacitive sensor,
   wherein the detector electrode has a movable tongue that can be made to extend by the adhesive flow, the movable tongue extendable out of a main plane of extent of the detector electrode, and
   wherein the flow detector has a test channel, which can be closed, for a manual deflection of the tongue, the test channel extending in through the other electrode of the pair of electrodes that is assigned to the detector electrode.

* * * * *

UNITED STATES PATENT AND TRADEMARK OFFICE
CERTIFICATE OF CORRECTION

PATENT NO. : 10,627,270 B2
APPLICATION NO. : 15/541798
DATED : April 21, 2020
INVENTOR(S) : Andreas Pahl Page 1 of 1

It is certified that error appears in the above-identified patent and that said Letters Patent is hereby corrected as shown below:

In the Specification

1. In Column 5, Line 42, delete "based in" and insert -- based on --, therefor.
2. In Column 6, Line 26, delete "it being" and insert -- it is being --, therefor.
3. In Column 6, Line 63, delete "DESCRIPTION" and insert -- BRIEF DESCRIPTION --, therefor.
4. In Column 7, Line 37, delete "entrance of" and insert -- entrance 19 of --, therefor.
5. In Column 8, Line 43, delete "it being" and insert -- it is being --, therefor.
6. In Column 10, Line 34, delete "there by" and insert -- thereby --, therefor.

In the Claims

7. In Column 12, Lines 27-28, in Claim 6, delete "wherein in that the" and insert -- wherein the --, therefor.

Signed and Sealed this
Eighteenth Day of August, 2020

Andrei Iancu
*Director of the United States Patent and Trademark Office*